United States Patent [19]
Vasishth

[11] 3,930,089

[45] Dec. 30, 1975

[54] PROCESSES FOR MAKING COMPOSITE RICE HULL-RESIN ARTICLES, PRODUCTS THEREOF, PROCESSES FOR MAKING RESIN-COATED RICE HULLS AND PRODUCTS THEREOF

[75] Inventor: Ramesh C. Vasishth, Delta, Canada

[73] Assignee: Cor Tech Research Limited, Richmond, Canada

[22] Filed: Apr. 5, 1974

[21] Appl. No.: 458,220

Related U.S. Application Data

[62] Division of Ser. No. 314,973, Dec. 14, 1972, Pat. No. 3,850,677.

[52] U.S. Cl. .............. 428/212; 156/62.2; 264/123; 428/524; 428/323; 428/407; 260/38
[51] Int. Cl.² ........................................... B32B 5/16
[58] Field of Search ......... 161/162, 168, 265, 257, 161/166; 264/113, 123, 128; 156/62.2

[56] References Cited
UNITED STATES PATENTS

| | | | |
|---|---|---|---|
| 2,817,617 | 12/1957 | Rogers | 161/162 |
| 3,660,223 | 5/1972 | Casalina | 161/168 |
| 3,663,673 | 5/1972 | Rionda | 161/166 |

*Primary Examiner*—William J. Van Balen
*Attorney, Agent, or Firm*—Sim & McBurney

[57] ABSTRACT

A composite article is fabricated from a composite mass comprising rice hulls coated with a caustic-free, thermosetting phenol formaldehyde resin which is of a type that in its uncured state has a viscosity above 100 Krebb units at 120°F by curing the resin of the mass. The resultant product can have many uses and is particularly suitable as a water-resistent board that may be used to fabricate a building.

43 Claims, No Drawings

PROCESSES FOR MAKING COMPOSITE RICE HULL-RESIN ARTICLES, PRODUCTS THEREOF, PROCESSES FOR MAKING RESIN-COATED RICE HULLS AND PRODUCTS THEREOF

CROSS-REFERENCE TO RELATED APPLICATIONS

The invention disclosed herein is related to copending application Ser. No. 421,068 filed Dec. 3, 1973, and is a divisional of application Ser. No. 314,973 filed Dec. 14, 1972, now U.S. Pat. 3,850,677.

BACKGROUND OF THE INVENTION

This invention relates to composite articles fabricated from rice hulls and certain phenol formaldehyde resins as well as to processes for making such composite articles. This invention also relates to intermediates useful in the production of such composite articles and to processes for making such intermediates.

While in the description to follow reference will be made to composite boards or sheets and processes for making the same, it is to be understood that a composite board is merely one example of a composite article embodying this invention, and many different articles may be fabricated using the techniques described herein and fall within the scope of this invention. For example, a composite article embodying this invention may be an article of furniture, such as a table, or a box useful for packaging.

Composite boards commonly are produced by suitably combining a fibrous material such as wood chips or flakes with a thermosetting synthetic resin adhesive, such as urea formaldehyde resins, and curing the resin of the mass under heat and pressure. Other fiberous materials, such as straw and coconut husk, can be used. Also, other thermosetting adhesives are used, such as phenol formaldehyde and melamine formaldehyde resins to obtain boards that have improved water resistance. The amount of synthetic resin adhesive used usually is from 2% to 10% based upon the weight of the board. Such boards have many uses. For example they are used as walls and floors in the construction of buildings. They also are used in furniture manufacture and as packaging material.

Rice hulls (also called rice husk or paddy husk) are a by-product of the rice processing industry. They are available in large quantities in every rice growing country. At present, rice hulls have no large scale commercial use. Consequently, where rice is processed in large quantities, considerable waste disposal problems are encountered.

Many processes have been devised to produce composite boards from rice hulls. However, none of these processes have found commercial acceptance, as the processes developed were not economically viable. Thus E. C. Lathrop et al in "Hard Board from Agricultural Residues", Modern Plastics, 126 (April, 1951) reported the use of a combination of powdered thermosetting phenolic resin, pine gum and ground husks. He found that boards made by using as much as 15% synthetic resin were too brittle to be nailed. Moreover, the boards made had a density of 1.12 (69.9 lbs./cubic foot). This combination of 15% powdered resin and high density makes the board too expensive to compete with currently available products, and the brittleness of the board places a severe limitation on its use.

The use of heat and pressure alone under high moisture conditions to make a composite board has been reported in U.K. Pat. No. 1,197,965 dated May 8, 1970, M. S. Iyengar. The production of such boards requires long press times (30 minutes for ¼ inch thick boards) and high pressures (900 p.s.i.).

SUMMARY OF THE INVENTION

In accordance with one aspect of this invention, there is provided a novel process whereby excellent non-brittle composite articles, such as boards, for example, at densities as low as 30 lbs. per cubic foot can be produced by using only 6 to 10% of a synthetic resin binder, relatively low pressures of about 160 to 500 p.s.i. and temperatures of 350° to 450°F., and relatively short press times (4 minutes for ¼ inch thick boards). The process requires the use of suitable synthetic resin adhesives in combination with rice hulls that, in the preferred embodiment, have been cleaned and the fines removed therefrom. The process does not require overly large quantities of the thermosetting resin adhesive or high pressure or high temperatures or high densities, and gives good production capacity, thus becoming very competitive, economically, with current products, such as wood particle boards. Boards of different thicknesses, as thin as ⅛ inch and as thick as 1 inch, have been produced and, undoubtedly, the process can be used for producing boards of any conceivable thickness. Thus, for example, one can make 6 inch or 8 inch thick boards, solid or hollow, by extrusion or by other suitable means to produce many useful products. These thick constructions could be used in a variety of manners. They may, for example, be used as pre-formed walls for homes. The process opens a practical way for the conversion of a hitherto waste material into a useful product.

The aforesaid process involves the fabrication of a composite article, a board or sheet, for example, from a composite mass comprising rice hulls coated with a causticfree, thermosetting phenol formaldehyde resin which is of a type that in its uncured state has a viscosity above 100 Krebb units at 120°F by curing the resin of the mass. The resultant composite article also is new and useful and constitutes a further aspect of this invention.

In accordance with another aspect of this invention, there are provided processes for producing the composite mass referred to hereinabove. Such masses are useful in the fabrication of composite articles embodying one aspect of this invention and themselves constitute yet another aspect of the invention.

Rice hulls are different from wood in that the fiber length in rice hulls is only about 0.3 mm. compared to 6–7 mm. in wood (see E. C. Lathrop, "The Industrial Utilization of Rich Hulls", Rice Annual, pp. 13, 1952). Moreover, rice hulls contain about 18–20% silica, a substantial part of this being concentrated on the outer surfaces of the hull (see R. S. Thomas and F. T. Jones, "Microincineration and Scanning Electron Microscopy, Silica in Rice Hulls", 28H, Annual Proceedings, EMSA). It is reported that when rice hulls are treated with a 2% caustic solution over 40% by weight of the rice hulls can be extracted into the caustic solution (see the last-mentioned Lathrop article), showing that rice hulls are easily decomposed by alkalis.

Thermosetting phenol formaldehyde resins are used commonly as adhesives in the forest product industry. Phenol formaldehyde resins are substantially immiscible with water. Being acidic, they are, however, soluble in strong alkalis. For ease of application, these resins therefore are dissolved in aqueous sodium hydroxide solutions. Since rice husks are attacked by even dilute solutions of caustic (see last-mentioned Lathrop article), such aqueous, alkaline, phenol formaldehyde thermosetting resin solutions are not suitable as adhesives for binding rice hulls.

Phenolic resin binders are well known for their water resistance and exterior durability. Thus, for example, plywood bonded with these adhesives is regarded as "exterior grade". Composite boards made with these resins also show extreme water resistance. Their water resistance can be shown by taking a sample of particle board bonded with a thermosetting phenol formaldehyde resin and boiling it in a submerged condition in water for an hour or two. Since the phenolic adhesives commonly used are in caustic solution, composite boards made by using these necessarily contain caustic. The presence of caustic does not affect the water resistance of the cured adhesive. However, it does increase the degree of swelling of the wood on exposure to water. In actual practice this creates a limitation on the use of such particle board. Thus, for example, such a material is not suitable for use as kitchen counter tops that are located near water taps and sinks, even though it is bonded with a waterproof resin. Therefore the need exists for a method for using caustic-free phenol formaldehyde resins as binders for composite boards. It also is known that caustic-containing phenol formaldehyde resins, when cured, are very dark in colour. Caustic-free phenolic resins, on the other hand, are relatively light in colour, even in the cured state. Consequently, composite boards made from caustic-free resins are lighter in colour and, therefore, better in appearance.

DESCRIPTION OF THE PREFERRED EMBODIMENTS

When rice hulls are used for the manufacture of composite boards, it has been discovered that some of their special characteristics have to be taken into account. It has been found that the surface of rice hulls contains materials that are only loosely bound to the fiber structure underneath. Consequently, in preferred embodiments of the invention where product strength is important, it is necessary to remove this loosely bound material prior to use. Such "cleaning" may be accomplished by physical means, such as toppling. Mixtures of rice hulls and a fine hard material can be fluidized in a fluid stream, such as air to accomplish this cleaning. In other words, it is sufficient to subject the rice hulls to the abrasive action of a hard material sufficiently fine to reach all surfaces of the hulls. The exact physical method of achieving this abrasive action is immaterial. A similar "cleaning" effect also can be achieved by subjecting the rice hulls to a grinding action.

It also has been found, where product strength is important, that it is not enough to just "clean" the hulls in any of the manners described above. It also is necessary to remove the dust from the rice hulls after this cleaning. This may be achieved by any of the commonly used methods of size separation, such as sieving, air cyclone and air floatation, followed by removing the fines.

Rice hulls as they come from the rice mill consist of pods that may contain the two husk leaves joined together. If the hulls are used in this physical form, it is difficult to apply the synthetic resin adhesive to all of the inside surfaces of the hulls. Consequently, composite boards made from rice hulls in this state are weak, as there is little or no bonding of the inside surfaces. It has been found that when the hulls are subjected to physical actions, such as the ones described above, this physical action also tends to separate the pods into individual leaves. It also has been found that whereas grinding in a hammer mill, followed by sieving, also will serve the dual purpose of "cleaning" and separating the pods into individual leaves, the hulls so processed are broken up into pieces so as to shorten their overall length. The boards produced from these hulls are not as strong as the ones produced by using milder means of physical treatment, such as simple toppling. This mild treatment breaks the pods into leaves and mainly cuts the hulls along their length.

While it is important that hulls used in the practice of the preferred embodiment of this invention be clean and have fines removed therefrom, herein referred to as "cleaned and fines removed rice hulls", it should be understood that the actual steps of cleaning and fines removal are not essential to the practice of the preferred embodiment of this invention in its broadest aspect. What is necessary in the preferred embodiment however, is the provision and utilization of cleaned and fines removed rice hulls. It also is to be understood, however, that where product strength is not an important factor, e.g., in the case of ornamental or decorative articles, the provision of cleaned and fines removed rice hulls is not essential, and rice hulls that have not been so pretreated can be employed.

Lathrop et al. have reported in the first-mentioned article the use of powdered phenol formaldehyde resins for making high density (69.8 lbs./cubic foot) boards out of rice husks. Powdered phenol formaldehyde resins are relatively expensive because of the extra cost of crushing and grinding.

An important feature of this invention is the discovery that liquid, caustic-free thermosetting phenol formaldehyde resins which have a viscosity above 100 Krebb units at 120°F. can be used advantageously as suitable binders for rice hulls. Resin concentrations as low as 6% based on the weight of the hulls may be used, although concentrations of 8% to 10% are preferred. While resin concentrations lower than 6% might be used in the fabrication of certain types of composite rice hull-resin articles, generally speaking such articles will lack a high degree of coherence. Resin concentrations in excess of 10% are possible but with attendant increased expense. Such resins, because they do not contain caustic, are largely water immiscible and can be made in relatively high concentrations of 70% to 90%. From the point of view of the quality and characteristics of the composite article produced in accordance with this invention, there is no upper limit to the viscosity of the resin which may be employed as long as its viscosity is above 100 Krebb units at 120°F. However, if the resin is applied to the rice hulls in liquid rather than solid form, the higher the viscosity, the more difficult will be the resin handling and application problem.

It is necessary to get a very uniform coating of the resin on the hulls. For this purpose a rotating blender provided with baffles and equipped with means for spraying the phenol formaldehyde resin onto the hulls may be used. Other types of equipment, as is commonly used in the manufacture of wood particle board, may be employed. Thus, for example, the resin may be rubbed onto the hulls using a suitable set of rollers. While it is important that the hulls used in the practice of this invention be coated with a resin of the aforementioned type, it should be understood that the actual coating step is not essential to the practice of this invention in its broadest aspect. What is necessary, however, is the provision of rice hulls that have been coated with such a resin. In essence, the basic building block of the invention from a product point of view is a rice hull coated with such a resin.

Water immiscible, caustic-free, thermosetting phenol formaldehyde resins having the high viscosity characteristic noted above cannot be used in a practical fashion at room temperature. However, these resins can be lowered in viscosity by heating them to about 150°F, although they still remain difficult to apply. Thus, if spraying is used, they do not spray well, as the atomizing air at room temperature chills the resin as soon as it comes out of the spray nozzle. It has been found that the resins can be sprayed satisfactorily at 150°F. by preheating both the atomizing air and the resin.

Most water immiscible, caustic-free thermosetting phenol formaldehyde resins rapidly gel at temperatures above about 120°F. Therefore it is very important that the resin should not be heated above 150°F. for any substantial length of time. Actually, it is important that the resin should not be even kept at 150°F. for more than the minimum necessary time. The spraying of the resin at the minimum possible temperature may be achieved by using a combination of hot resin and hot air. After spraying, quick chilling of the resin may be achieved by spraying the resin onto hulls that are at room temperature. It has been found that this combination of hot resin, hot air and cold hulls is an important condition for the practical and successful use of water immiscible high solids, caustic-free phenol formaldehyde resins when applied by a spraying technique.

Caustic-free, thermosetting phenol formaldehyde resins cure differently at different pH's. Thus caustic-free, water immiscible, thermosetting, liquid phenol formaldehyde resins cure faster at low pH's. Mineral or organic acids may be used for reducing the pH. Some examples of suitable inorganic acids are phosphoric acid, sulfuric acid and hydrochloric acid. Some examples of suitable organic acids are acetic acid, p-toluene sulfonic acid and p-toluene benzoic acid. In fact, the sole purpose of using an acid is to drop the pH.

Other chemicals that decompose on heating to yield an acid, may be used as well. Examples of such chemicals are amine salts of acids or esters of sulfonic acids. The use of an acid catalyst improves the economy of the process by reducing the duration of hot pressing and consequently increasing plant capacity. The use of the catalyst is, therefore, desirable but not mandatory.

Since the addition of acids to thermosetting phenol formaldehyde resins of the type contemplated herein further accelerates their rate of cure, the storage stability of such acid catalysed thermosetting phenol formaldehye resins is essentially very short. When these resins are heated to 150°F to reduce their viscosity to that of a sprayable point, they may gel instantly or in a matter of minutes. The exact time of gelation depends upon the amount of catalyst added. Therefore it would appear that such acid catalysed resins cannot be used when the resin is applied to rice hulls by hot spraying.

However, it has been found that the aforementioned difficulties can be overcome by spraying the catalyst and the resin separately. The spraying may be performed conveniently by using two different spray nozzles. The acid, solution of an acid or acid providing chemical may be sprayed simultaneously with the resin or before or after the resin has been sprayed.

The object of spraying the resin and the catalyst separately is to limit their contact at the elevated temperatures required for resin spraying. This is necessary for optimum operation. It has been found that another way of limiting the catalyst-hot resin contact time is to use a two component spray head with internal or external mixing. Such pieces of equipment are commercially available. When such equipment is used, the catalyst is mixed with the resin just prior to atomizing, as would be the case in an internally mixed two component spray system, or just after atomizing, as would be the case in an externally mixed two component spray system. In either case, the resin-catalyst mixture remains at elevated temperature for a short time so as not to effect the subsequent binding power of the resin, the resin-catalyst mixture being almost instantly chilled once it contacts the rice hulls.

It should be pointed out that the acceleration of the cure rate of thermosetting phenol formaldehyde resins of the type contemplated for use herein is dependent upon the amount of acid or acid-yielding chemical added. It is necessary therefore, to adjust the quantity of acid added to achieve a practical operating system. Thus, for example, if too much acid is added, the two component spray system may not be usable. The addition of too much acid also may limit the usable life of the acid-resin coated hulls. It also is perfectly feasible to first spray the rice hulls with resin, and then at some convenient time prior to hot pressing, spray the resin-coated hulls with the desired quantity of acid, thus greatly extending the storage life of the resin-coated hulls.

While it is preferred to apply the resin in liquid form either by a spraying or rolling technique, in some cases the resin may be applied in solid form as a fine powder, the rice hulls and resin powder being tumbled together until the rice hulls are completely covered with the resin powder. This is not a preferred technique, however, because of the additional cost of crushing and grinding the solid resin.

Caustic-free, thermosetting phenol formaldehyde resins that are emulsifiable are revealed in South African Patent No. 70/4749 dated Feb. 2, 1971. Provided that such resins are "cooked" for a sufficient period of time in their manufacture to provide a resin having the viscosity requirements set out herein, it has been found that such resins when emulsified, can be sprayed with ease at room temperature onto rice hulls and can be used in the practice of this invention. However, the preparation of the emulsion requires expensive protective colloids and adds significantly to the cost of the resin.

Such resin emulsions are not stable at concentrations above fifty percent. Consequently, a large quantity of water has to be sprayed onto the rice hulls when an emulsion is used. The hulls, as they come from a rice mill, are at 6 to 9% moisture. It is well known that moisture content in excess of 11% on the furnish does not give a good composite board. Therefore, any water that is sprayed with the resin emulsion has to be removed before the resin coated hulls can be used to make a composite board. This constitutes an extra process step, adding to cost.

It has been found that such thermosetting emulsifiable phenol formaldehyde resins as are disclosed in South African Patent No. 70/4749, even when modified to meet the viscosity requirements set out herein, also can be sprayed without emulsification by the procedure described earlier, i.e., by using a combination of hot resin, hot air and cold husk.

A procedure for spraying an acid catalyst separately from the resin has been described earlier. This procedure also is applicable to emulsifiable, caustic-free thermosetting phenol formaldehyde resins, eg. those of South African Patent No. 40/4749, when they are not sprayed or used as emulsions, and when they meet the viscosity requirements set out herein. However, it has been found that when these resins are used as emulsions and under these conditions sprayed at room temperature, it is perfectly feasible to add the acid or acid-yielding catalyst to the emulsion prior to use and spray the mixture in one step. When acid or acid-yielding catalysts are added to the emulsion, it is desirable to use catalysts that are highly soluble in the resin, for example, p-toluene sulfonic acid. It has been found accidentally, and it is an important feature of one aspect of this invention, that the hulls so coated can be partially cured at room temperature to the point where they feel dry to the touch and then stored for an extended period of time at room temperature without affecting the binding power of the adhesive. Storage periods in excess of one month may be realized.

It should be pointed out that such extended storage life as one or two months at room temperature of the adhesive-coated hulls, even after catalyst application, and without affecting the binding properties of the adhesive, is obtained only when emulsifiable thermosetting resins such as are discribed in the South African Patent No. 70/4749 are used. As far as the practicality of application goes, it is immaterial whether such resins are hot sprayed at 80 – 100% solids, or used as emulsions, extended storage lives of adhesive-coated hulls are obtained. The exact period of usable storage life is dependent upon the amount of catalyst used. Uncatalysed resins of the type set out in the South African Patent and modified to meet the viscosity requirements set out herein have storage lives of the order of two or three years. This storage life may be reduced to several months when catalyst corresponding to 1%–2% by weight of the resin is used. The usable storage life decreases with increased quantities of catalyst addition. When large excesses of acids or acid-yielding chemicals, i.e., more than about 15 weight % based upon the resin solids, are used, this advantage of extended storage life at room temperature is lost.

The ability to provide storage-stable, resin-coated hulls is an important feature of one aspect of this invention, since this means that the manufacturer that applies the coating need not be the manufacturer of the composite article. The former manufacturer can ship its resin-coated hulls to the composite article manufacturer. Carrying this one step further, the steps of cleaning and fines removal can be performed independently of the coating step, say, in a facility set up in the rice fields themselves, and the cleaned and fines removed rice hulls shipped at less cost (because of reduced weight) to the manufacturer who will apply the resin coating.

In South African Patent No. 70/4749 it is mentioned that the thermosetting emulsifiable resin disclosed therein may be used in organic solvents such as acetone, benzyl alcohol, etc. The use of such solvents for the production of composite boards would be quite uneconomical. The use of such solvents also poses health and fire hazards. Technically though, it has been found that the resins with a viscosity above 100 Krebb units at 120°F. could be dissolved in many strong, polar, organic solvents and the resultant solutions, like the emulsions of these resins, were low enough in viscosity to be applied to rice hulls by spraying at room temperature or by other physical means such as rubbing. As expected, these resins showed the same behavior as exhibited by the emulsions of these resins, i.e. they did give a shelf life of a month or more when coated on the hulls together with appropriate quantity of the catalyst.

The thermosetting, emulsifiable resins may be used in practising this aspect of the invention may be characterized as a phenol formaldehyde resin having the viscosity requirements set out herein and having the general formula

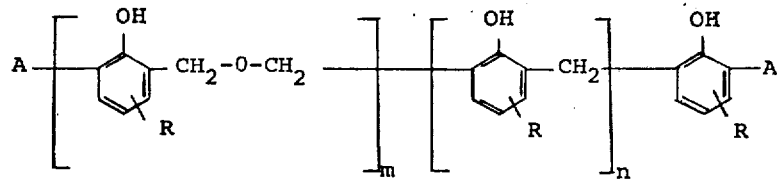

wherein R is hydrogen, hydrocarbon radical, oxyhydrocarbon radical or halogen, meta to the hydroxyl group of the phenol; $m$ and $n$ are numbers the sum of which is at least two and the ratio of $m$-to-$n$ is greater than one; and A is a hydrogen or a methylol group, the molar ratio of said methylol group to hydrogen being at least one.

In order to form a composite article such as a board according to the process of the present invention, the resin or the resin-acid coated hulls have to be formed into a mat and the resin cured. The mat may be placed in a hot press and subjected to heat and pressure for a suitable period of time to effect this curing. Wide variations in pressures and temperatures are possible, just as in the particle board industry, as known to those skilled in the art. Factors such as moisture content, board thickness, amount of resin etc. all have a bearing on times and temperatures In general, however, it is preferred to operate with pressures of the order of 160 to 500 p.s.i. and temperatures between 350°F and 450°F.

The mat may be of any of the forms commonly used in the composite board industry. Thus, for example, the acid-adhesive content of the mat may be the same throughout the thickness of the mat. If greater surface hardness is required, the mat may be laid in layers, with hulls on the two faces having been coated with 10 – 12% resin and the middle of core layer having been coated with only 8 – 10% resin. Additional economies thus are achieved. Then again, the mat faces may contain more fines relative to the core to achieve a finer surface compared to that of the core.

When the desired mat has been laid, using a conventional forming machine, for example, and fed into the press, it is subjected to heat and pressure in order to cure the adhesive and obtain a composite board of the desired density and thickness. During this process step the surface of the mat reaches the temperature of the hot press platen in a matter of half a minute or so. The center of the mat, however, heats relatively slowly. The thicker the board being made, the slower is the rate of temperature rise in the middle of the mat. Consequently, the adhesive in the center of the mat cures over a longer period of time than the face. To achieve economically short press times, particularly for boards over about ¼ inch thick, it may be desirable, therefore, to use resin-catalyst coated husk with different amounts of catalyst distributed through the thickness of the mat. Thus, the faces may contain very little or no catalyst and the core may contain 5 - 10% catalyst based upon resin solids to accelerate its curing at relatively lower temperature. Similar control, to prevent overcure or precure on the face and undercure in the core, may be obtained by varying the amount of moisture through the thickness of the mat.

All of the above procedures, or combinations thereof, and other procedures commonly used by persons experienced in the art of composite board manufacture thus may be utilized in conjunction with the basic process disclosed herein for maximum commercial exploitation.

Heat and pressure normally both are required during the final curing stage where it is desired to produce a strong article. Where strength is not so important, curing may be effected using heat alone and a shell moulding technique.

The salient features of certain aspects of this invention are brought out in the following examples which are strictly exemplary and not to be construed as limiting in scope.

EXAMPLES A. — RESIN PREPARATION

Example R.1

This example describes the preparation of a caustic-free, water immiscible, thermosetting phenol formaldehyde resin.

To phenol (1mole) and formaldehyde (2moles of 37% formaldehyde in water), magnesium oxide (2% by weight of phenol) were added. The reaction mixture was placed in a reaction vessel equipped with an agitator and means for heating and cooling the reaction mixture.

The reaction mixture was heated to 70°C. when an exothermic reaction was observed. The reaction mixture was cooled at this stage so as to keep the reaction temperature below 90°C. When the exotherm subsided, heating was recommenced and the mixture held between 70° and 90°C. During this heating the reaction mixture separated into two layers, an aqueous layer and a resin layer. Heating was continued till the viscosity of the resin layer reached 105 Krebbs at 120°F. The aqueous layer was separated from the resin layer, and the resin layer was used as a caustic-free, water immiscible, thermosetting resin binder for experiments described hereinafter.

Example R.2

This example describes the preparation of a caustic-free, water immiscible, thermosetting phenol formaldehyde resin that is emulsifiable and is at a low viscosity.

The procedure of example R.1 was repeated except that the catalyst used was zinc acetate. A resin of viscosity 56 Krebb units at 120°F and at a non-volatile content of 75% was prepared.

Example R.3

This example describes the preparation of a caustic-free, water immiscible, thermosetting phenol formaldehyde resin that is emulsifiable and is at a high viscosity.

The procedure of Example R.2 was repeated except that the heating was continued until a resin of viscosity of 101 Krebb units at 120°F and at a non-volatile content of 80% was prepared.

Example R.4

Part of the resin from Example R.2 was emulsified using the procedure described in South African Patent No. 70/4749 so as to obtain an emulsion containing 45% nonvolatiles.

Example R.5

Part of the resin from example R.3 was emulsified using the procedure of Example R.4 so as to obtain an emulsion containing 45% non-volatiles.

EXAMPLES B. — RICE HULL PREPARATION

Example H.1 (Ground Rice Hulls with Fines)

Rice hulls were put through a hammer mill equipped with a 20 mesh screen. The hulls so treated contained about 20% particles that went through a 40 mesh screen.

Example H.2 (Ground Rice Hulls without Fines)

Part of the hulls from Example H.1 were sieved so as to remove all particles that went through a 40 mesh screen.

Example H.3 (Tumbled Rice Hulls)

Rice hulls were charged to a tumbler so as to fill the tumbler to a little below half its volume. The tumbler was a cylindrical vessel equipped with rotating paddles installed so as to rotate along the length of the vessel about an inch away from the wall. The cylindrical vessel itself was stationary. Tumbling was continued for 15 minutes. During the tumbling process, fines settled on the walls of the vessel. Moreover, the rice hull pods broke up into individual leaves, and a substantial portion were further reduced in size, but mainly along the length of the hulls. The bulk density of hulls changed from 8 lbs. per cubic foot to about 18 lbs. per cubic foot due to the separation of the pods into individual leaves and their subsequent size reduction.

The tumbled hulls so obtained were sieved through a 40 mesh screen so as to remove the fines. The fines were discarded.

EXAMPLES C. — ADHESIVE APPLICATION

A blender having a diameter of approximately 4 feet, a depth of about 1 foot capable of rotating along its horizontal cylindrical axis and equipped with baffles, was used. The baffles, when the blender was charged with rice hulls and rotated, served to lift the hulls and drop them as a continuous falling curtain.

The blender was equipped with a spray gun that could be placed at its center so as to direct an air atomized spray of resin on to the falling curtain of rice hulls. The spray gun was capable of spraying heated resin with hot air and the temperatures of the two could be independently controlled. Resin also could be sprayed at room temperature and using air at ambient temperatures with the same equipment. The same equipment could be used for spraying the catalyst onto the hulls.

Using this equipment and resins described in the previous examples, hulls treated in ways described in previous examples (H.1 to H.3) were sprayed with 10% resin solids based upon the weight of the hulls. An acid catalyst (50% para toluene sulfonic acid) at 20% by weight of the resin used also was applied. The hulls so coated were air dried overnight. Portions of hulls treated according to example H.3 and coated with the resin of examples R.1 and examples R.3 respectively were kept for four weeks prior to hot pressing. Weighed quantities of the resin-coated hulls then were laid into mats on caul plates, placed into a hot press at 390° to 410°F. and pressed for a predetermined length of time. The thickness of the boards was controlled by placing suitably cut 2 inches wide steel spacers between the press platens. The rice husk boards so made were tested for Internal Bond Strength (IB) and Modulus of Rupture (MOR) using the ASTM Procedure D-1037-64, Sections 27-32 and 10-19 (excluding Section 12) respectively. Generally speaking, a satisfactory board of 5/8 inch thickness should have an IB in excess of about 60 lbs/in$^2$ and an MOR in excess of about 900 lbs./in$^2$.

The results are presented in Tables I and II below.

TABLE I

Results showing the Relative Performance of Various Resins

| Resin Used from Example | Hulls Used from Example | Board Thickness (in.) | Board Density (lbs/ft$^3$) | IB (lbs/in$^2$) | MOR (lbs/in$^2$) |
|---|---|---|---|---|---|
| R-1 | H-3 | ⅝ | 50 | 75 | 1800 |
|  | H-3* | ⅝ | 50 | 10 | 300 |
| R-2 | H-3 | ⅝ | 50 | 35 | 900 |
| R-3 | H-3 | ⅝ | 50 | 80 | 1900 |
|  | H-3* | ⅝ | 50 | 82 | 1850 |
| R-4 | H-3 | ⅝ | 50 | 30 | 870 |
| R-5 | H-3 | ⅝ | 50 | 85 | 1870 |

*Hulls coated with Resin and Catalyst were stored for one month before hot pressing.

TABLE II

Results showing the Influence of Hull Treatment of Board Quality

| Resin Used from Example | Hulls Used from Example | Board Thickness (in.) | Board Density (lbs/ft$^3$) | IB (lbs./in.$^2$) | MOR (lbs./in.$^2$) |
|---|---|---|---|---|---|
| R-3 | H-1 | ⅝ | 50 | 25 | 800 |
| R-3 | H-2 | ⅝ | 50 | 65 | 1400 |
| R-3 | H-3 | ⅝ | 50 | 80 | 1900 |
| R-3 | H-3 | ⅝ | 35 | 50 | 950 |
| R-3 | Raw Hulls No Pretreatment | ⅝ | 50 | 20 | 510 |

The results presented in Table 1 clearly show that caustic-free phenol formaldehyde resins in amount as small as 10% of the weight of the finished board can be used to produce composite boards from rice hulls. They also show that when these resins have a low viscosity (below 100 Krebb units at 120°F), the boards produced are not of acceptable quality irrespective of whether the resin is used as such or as an emulsion.

The results presented in Table II show that the mere selection of the right resin and resin viscosity does not give a strong board. Some pretreatment of the hulls to break down the pods into individual leaves and to remove the fines is necessary. Moreover, it is also clear that tumbled hulls give a better product than the ground hulls.

The difference between the second runs using the R-1 and R-3 resins are reported in Table I indicate the necessity of employing emulsifiable resins to obtain storage stability.

While the board reported in run four in Table II does not meet the specifications for a 5/8 inch board set out previously herein, this does not means that the board is unsatisfactory for all uses. Its low IB is due to its low density, but it still may be satisfactory for the core of a door or an acoustic tile.

What I claim as my invention is:

1. A process for making a composite article which comprises the steps of
  a. providing a composite mass comprising rice hulls to which has been applied a substantially water immiscible, caustic-free, thermosetting phenol formaldehyde resin, said resin being of a type that in its uncured state has a viscosity above 100 Krebb units at 120°F and
  b. curing said resin of said mass, thereby forming a composite rice hull-resin article.

2. The process of claim 1 wherein said rice hulls are cleaned and fines removed rice hulls.

3. A process for making a composite article which comprises the steps of:
  a. applying to rice hulls a substantially water immiscible, caustic-free, thermosetting phenol formaldehyde resin, said resin being of a type that has a viscosity above 100 Krebb units at 120°F, thereby forming a composite rice hull-resin mass, and
  b. curing said resin of said mass, thereby forming a composite rice hull-resin article.

4. A process according to claim 3 wherein said rice hulls are cleaned and fines removed rice hulls.

5. A process according to claim 3 wherein said resin is in a liquid state when applied to said rice hulls.

6. A process according to claim 4 wherein said resin is in a liquid state when applied to said rice hulls.

7. A process for making a composite article which comprises the steps of
  a. physically cleaning rice hulls to remove surface material therefrom,
  b. separating fines from the resultant rice hulldust mixture,
  c. applying to the cleaned and fines removed rice hulls a substantially water immiscible caustic-free, thermosetting phenol formaldehyde resin, said resin being of a type that has a viscosity above 100 Krebb units at 120°F, thereby forming a composite rice hull-resin mass, and d. curing said resin of said mass, thereby forming a composite rice hull-resin article.

8. A process according to claim 7 wherein said resin is in a liquid state when applied to said rice hulls.

9. A process according to claim 2 wherein said article is a sheet and which includes the step of forming said mass into a sheet before curing of said resin of said mass.

10. A process according to claim 9 wherein said sheet is a board.

11. A process according to claim 2 wherein curing of said resin of said mass is effected by applying heat and pressure to said means.

12. A process according to claim 6 wherein said resin is applied to said rice hulls by spraying heated resin onto said rice hulls while agitating said rice hulls.

13. A process according to claim 12 wherein said rice hulls are agitated by means of a rotating blender.

14. A process according to claim 1 wherein said composite mass includes a chemical that lowers the pH of said resin.

15. A process according to claim 14 wherein said chemical is selected from the group consisting of acids, chemicals that yield acids during curing of said resin and mixtures thereof.

16. A process according to claim 6 wherein said composite mass includes a chemical that lowers the pH of said resin, said chemical being selected from the group consisting of acids, chemicals that yield acids during curing of said resin and mixtures thereof and is incorporated into said ricehull resin mass before, during or after application of said resin to said rice hulls.

17. A process according to claim 12 wherein the step of spraying is accomplished using heated air to atomizingly spray said heated resin from a spray nozzle.

18. A process according to claim 17 wherein said resin is at a temperature of about 150°F when sprayed.

19. A process according to claim 1 wherein said composite mass contains at least 6% by weight of said resin based on the weight of said rice hulls.

20. A process according to claim 1 wherein said composite mass contains between 8% and 10% by weight of said resin based on the weight of said rice hulls.

21. A process according to claim 7 wherein said rice hulls are physically cleaned by toppling said rice hulls.

22. A process according to claim 7 wherein said rice hulls are physically cleaned by grinding said rice hulls.

23. A process according to claim 7 wherein said rice hulls are physically cleaned by abrading the surfaces of said rice hulls with a fine, abrasive material.

24. A process according to claim 7 wherein said fines are separated by sieving said resultant rice hull-dust mixture.

25. A process according to claim 7 wherein said fines are separated by an air separation technique.

26. A process according to claim 1 wherein said resin is a water emulsifiable resin.

27. A process according to claim 11 wherein curing of said resin of said mass is effected at a temperature between 350°F and 450°F and under a pressure of between 160 and 500 p.s.i.

28. A process according to claim 6 wherein said resin is a water emulsifiable resin and is applied to said rice hulls as an emulsion, said emulsion additionally including a chemical that lowers the pH of said resin.

29. A process according to claim 28 wherein said chemical is selected from the group consisting of acids, chemicals that yield acids during curing of said resin and mixtures thereof.

30. A process according to claim 29 wherein said chemical is soluble in said resin.

31. A process according to claim 29 wherein between 1% and 15% by weight of said chemical based on the weight of said resin is used.

32. A process according to claim 31 wherein said resin is a water emulsifiable resin, said composite rice hull-resin mass is partially cured after formation, thereby providing discrete resin-coated rice hulls; said resin-coated rice hulls then are formed into the shape of an article and curing of said resin is effected by applying heat and pressure to said resin-coated rice hulls.

33. A process according to claim 32 wherein said resin-coated rice hulls are stored after partial curing and before being formed into said shape of said article.

34. A process according to claim 32 wherein curing of said resin is effected at a temperature between 350°F and 450°F and under a pressure of between 160 and 500 p.s.i.

35. A process according to claim 32 wherein said article is a board.

36. A composite article of manufacture comprising rice hulls in a binder of cured, caustic-free, thermosetting phenol formaldehyde resin, said resin being of a type that in its uncured state has a viscosity above 100 Krebb units at 120°F and which, when applied to said rice hulls, is substantially water immiscible.

37. A composite article of manufacture according to claim 36 wherein said resin is water emulsifiable in its uncured state.

38. A composite article of manufacture according to claim 36 wherein said rice hulls are cleaned and fines removed rice hulls.

39. A composite article of manufacture according to claim 38 wherein said article is a board.

40. A composite article of manufacture according to claim 38 containing at least 6% by weight of said resin based on the weight of said rice hulls.

41. A composite article of manufacture according to claim 38 containing between 8% and 10% by weight of said resin based on the weight of said rice hulls.

42. A composite article of manufacture according to claim 39 wherein said rice hulls at at least one surface of said board are finer than said rice hulls at the centre of said board.

43. A composite article of manufacture according to claim 39 wherein the weight percentage of said resin relative to said rice hulls is less at the center of said board than at at least one surface of said board.

* * * * *